106. COMPOSITIONS, COATING OR PLASTIC.

Patented May 2, 1939

2,157,018

UNITED STATES PATENT OFFICE 2,157,018

PRODUCTION OF PLASTIC COMPOSITIONS

Albert George Rodwell, London, England, assignor to Sydney Harrison Colton, London, England No Drawing. Application October 5, 1937, Serial No. 167,471. In Great Britain September 3, 1936

2 Claims. (Cl. 106—23)

This invention relates to plastic compositions of the kind that incorporate cement or the like and rubber latex or the like and that may be used as road-making material or in the construction of floors, walls and the like, and also on ships, for example as an intermediate layer between the steel frame and wooden planking of a deck.

Hitherto, in the commercial manufacture of plastic compositions of this kind the latex or the like has been used to provide the water necessary for the hydration and setting of the cement. In practice the use of acid cements has been avoided and aluminous cements have been used. Such cements are comparatively expensive, and moreover their colour prevents the products from being brightly coloured, even if pigments are introduced into the composition.

The principal object of the invention is to simplify the incorporation of the latex in the cement and to allow Portland or white cement to be used. A further object is to produce stronger products.

The basic idea underlying the present invention is to hydrate the cement before the latex is mixed with it, and it has been found that even though enough water is added to the cement to cause normal setting, the cement will absorb enough of the aqueous part of the latex to cause the latex to solidify in fibrous form without interference with the natural setting of the cement, that is to say, the mass solidifies with the latex substantially uncoagulated and with the cement normally hydrated, although the setting may be retarded. By "coagulation" is meant the breaking of the colloidal dispersion into discrete agglomerated particles. Thus, in proceeding according to the invention, hydraulic cement or lime plaster or gypsum plaster is formed into a homogeneous mixture with a quantity of at least sufficient to bring about complete hydration but not exceeding that quantity by more than 10%, and then before setting has taken place, latex or other colloidal dispersion of natural or synthetic rubber colloidally dispersed in a suitable medium such as water, is added, and the whole is allowed to set, which takes place substantially without coagulation of the latex or other dispersion utilized. The latex, which may be natural or concentrated and if desired pre-vulcanised, must be used in a colloidal form, and such forms of latex as coagulated or precipitated latex cannot be used, and are not included, in the present invention. It has surprisingly been found that so far from weakening the product, as might have been expected, the process according to the invention leads to a stronger product. This, however, is not the most important advantage, because by providing in the initial mixture enough water to set the cement the risk of coagulation of the latex or the like is much reduced, and the use of Portland or white cement becomes commercially practicable. Further, it is not necessary to exercise the same care in the mixing of the cement and latex as has been necessary hitherto, so that it is easier for an ordinary workman to prepare the compositions.

The amount of water necessary for complete hydration is the amount of water which on setting of the mix gives a product of maximum strength and depends upon the constitution of the cement for instance the lime content in the case of a lime cement and upon the humidity of the atmosphere, and it can easily be determined in any given case.

When the cement and latex have been mixed, but before any setting of the mix has taken place, stone or similar inert filling material in chip or powder form may be added and in this case the mix is thoroughly stirred up and is then ready for laying. Organic fillers such as cork, wood-flour and the like may also be used, as may fibrous materials. In powder form the fillers are dispersed uniformly throughout the final product, and large pieces or chips may be employed to produce a decorative effect. It is best to incorporate the usual vulcanising ingredients in the latex before this is mixed with the cement.

Under average conditions, the mixture of cement and water undergoes preliminary setting after about 35 minutes, and the latex must be added before this occurs. The mix is then of a cream-like consistency and it is found that the addition of the latex delays the preliminary setting of the cement for a further period of about two hours in the course of which period the mixture is laid. A wide range is permissible in the proportions of cement or the like and latex or the like which may be used and from ½ to 10 volumes of the concentrated latex may be added to each volume of the cement-water mixture according to the nature of the materials and the purpose for which the composition is required.

As one example 15 lbs. of white cement are hydrated with 5 lbs. of water, next 5 lbs. of concentrated rubber latex containing vulcanising ingredients are added, and then 3 lbs. of fibrous filling materials are added. It is to be understood that the figures of 15 lbs. of cement and 5 lbs. of water depend upon the nature of the cement and the humidity of the atmosphere. White cement is cement which is made from limestone, chalk or the like, and which is low in iron. This is commonly known in the United States as "Atlas White", in England as "Snow Crest", and as "Dyckerhoff White" in Germany. These are examples of this type of material and it is not intended to limit the disclosure to these substances only (page 321 of Chemistry of Cement and Concrete by F. M. Lee and C. H. Desch).

While I have described my invention in accordance with a preferred embodiment, it is obviously susceptible of many changes and variations without departing from the spirit of the invention as defined in the following claims.

I claim:

1. In the production of a plastic composition, the method which comprises mixing 15 parts by weight of white cement with approximately 5 parts of water, rendering the resultant mixture homogeneous, incorporating in said mixture approximately 5 pounds of concentrated rubber latex containing vulcanizing ingredients and before setting of the mixture adding fibrous filler material, and permitting the resultant admixture to set.

2. In the production of a plastic composition, the method which comprises mixing white cement with approximately one third its weight of water, rendering the resultant mixture homogeneous, incorporating in said mixture concentrated rubber latex containing vulcanizing ingredients, adding filler material, the addition of the latex and the filler being made before setting the mixture, and permitting the resultant mixture to set.

ALBERT GEORGE RODWELL.